(12) United States Patent
Kim et al.

(10) Patent No.: US 10,877,601 B2
(45) Date of Patent: Dec. 29, 2020

(54) DISPLAY DEVICE

(71) Applicant: Samsung Display Co., Ltd., Yongin-si (KR)

(72) Inventors: Jang Hui Kim, Yongin-si (KR); Sang Chul Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 45 days.

(21) Appl. No.: 16/214,213

(22) Filed: Dec. 10, 2018

(65) Prior Publication Data

US 2019/0220143 A1 Jul. 18, 2019

(30) Foreign Application Priority Data

Jan. 18, 2018 (KR) .......................... 10-2018-0006653

(51) Int. Cl.
| | |
|---|---|
| *G06F 3/041* | (2006.01) |
| *G09G 3/3233* | (2016.01) |
| *G09G 3/3266* | (2016.01) |
| *G06F 3/044* | (2006.01) |
| *G09G 3/3275* | (2016.01) |
| *G06K 9/00* | (2006.01) |

(52) U.S. Cl.
CPC ............ *G06F 3/0418* (2013.01); *G06F 3/044* (2013.01); *G09G 3/3233* (2013.01); *G09G 3/3266* (2013.01); *G09G 3/3275* (2013.01); *G06K 9/0002* (2013.01); *G09G 2300/0809* (2013.01); *G09G 2300/0842* (2013.01); *G09G 2330/06* (2013.01); *G09G 2354/00* (2013.01)

(58) Field of Classification Search
CPC ..... G06F 3/0418; G06F 3/044; G09G 3/3233; G09G 3/3266; G09G 3/3275
See application file for complete search history.

(56) References Cited

U.S. PATENT DOCUMENTS

| | | | |
|---|---|---|---|
| 8,508,503 B2 | 8/2013 | Lin et al. | |
| 9,075,259 B2* | 7/2015 | Kim | ..................... G02F 1/13338 |
| 2010/0110040 A1* | 5/2010 | Kim | ..................... G06F 3/0412 |
| | | | 345/174 |
| 2011/0193817 A1* | 8/2011 | Byun | ..................... G06F 3/0418 |
| | | | 345/174 |

(Continued)

FOREIGN PATENT DOCUMENTS

| KR | 10-2017-0031303 | 3/2017 |
|---|---|---|
| KR | 10-1763939000 | 8/2017 |

*Primary Examiner* — Ariel A Balaoing
(74) *Attorney, Agent, or Firm* — H.C. Park & Associates, PLC

(57) ABSTRACT

A display device including: a display panel for generating an image; and an input sensing layer disposed on the display panel, the input sensing layer sensing a user input. The display panel includes: pixels each including an organic light emitting diode that emits light, corresponding to a driving current flowing from a first power source to a second power source; and a noise detector for generating a noise voltage by detecting noise from the second power source. The input sensing layer includes: first sensing electrodes and second sensing electrodes intersecting each other; and a readout circuit for removing the noise included in a sensing voltage received from the second sensing electrodes based on the noise voltage.

15 Claims, 5 Drawing Sheets

(56) References Cited

U.S. PATENT DOCUMENTS

| | | | | |
|---|---|---|---|---|
| 2014/0152617 A1* | 6/2014 | Kida | ............... | G06F 3/044 |
| | | | | 345/174 |
| 2014/0152643 A1* | 6/2014 | Kim | ............... | G09G 3/3258 |
| | | | | 345/212 |
| 2014/0218331 A1* | 8/2014 | Chang | ............... | G06F 3/044 |
| | | | | 345/174 |
| 2014/0333676 A1* | 11/2014 | Fujii | ............... | G09G 3/3233 |
| | | | | 345/690 |
| 2015/0378511 A1* | 12/2015 | Wu | ............... | G06F 3/044 |
| | | | | 345/174 |
| 2016/0140898 A1* | 5/2016 | Hyun | ............... | G09G 3/3233 |
| | | | | 345/694 |
| 2017/0075472 A1 | 3/2017 | Youl et al. | | |
| 2017/0131829 A1* | 5/2017 | Takahashi | ............... | G06F 3/0412 |
| 2017/0131838 A1* | 5/2017 | Lu | ............... | G06F 3/0418 |

* cited by examiner

DISPLAY DEVICE

CROSS REFERENCE TO RELATED APPLICATION

This application claims priority from and the benefit of Korean Patent Application No. 10-2018-0006653, filed on Jan. 18, 2018, which is hereby incorporated by reference for all purposes as if fully set forth herein.

BACKGROUND

Field

Exemplary embodiments of the invention relate to a display device.

Discussion of the Background

With the development of information technologies, the importance of a display device, which is a connection medium between a user and information, increases. Accordingly, display devices, such as a liquid crystal display device and an organic light emitting display device, are increasingly used.

Recently, there have been developed display devices including touch sensors for sensing touches, fingerprint sensors, pressure sensors, etc.

The above information disclosed in this Background section is only for understanding of the background of the inventive concepts, and, therefore, it may contain information that does not constitute prior art.

SUMMARY

Exemplary embodiments provide a display device including a display panel for detecting noise from a driving power source and an input sensing layer for removing noise of a sensing signal.

Additional features of the inventive concepts will be set forth in the description which follows, and in part will be apparent from the description, or may be learned by practice of the inventive concepts.

An exemplary embodiment of the invention provides a display device including: a display panel configured to generate an image; and an input sensing layer disposed on the display panel, in which the input sensing layer senses a user input. The display panel includes: pixels each including an organic light emitting diode that emits light corresponding to a driving current flowing from a first power source to a second power source and a noise detector configured to generate a noise voltage by detecting noise from the second power source. The input sensing layer includes first sensing electrodes and second sensing electrodes intersecting each other and a readout circuit configured to remove the noise included in a sensing voltage received from the second sensing electrodes, based on the noise voltage.

The input sensing layer may be directly disposed on the display panel.

The display panel may further include a driving power supply configured to supply the first power source and the second power source to the pixels, and supply a third power source and a fourth power source to the noise detector.

The noise detector may include a sensing capacitor configured to store the noise voltage.

The noise detector may further include: a first switch connected between a first electrode of the sensing capacitor and the second power source; and a second switch configured to selectively supply any one of the third power source and the fourth power source to a second electrode of the sensing capacitor.

When the first switch is turned on, the second switch supplies the third power source to the second electrode of the sensing capacitor. When the first switch is turned off, the second switch supplies the fourth power source to the second electrode of the sensing capacitor.

The third power source may have a voltage of the second power source, in which the noise is not included, and the fourth power source may have a ground voltage.

The display device may further include: a scan driver configured to supply scan signals to scan lines formed for every horizontal line; and a data driver configured to supply data signals to data lines formed for every vertical line. The pixels may be connected to the scan lines and the data lines.

A pixel connected to an ith (i is a natural number) scan line and a jth (j is a natural number) data line among the pixels may include: the organic light emitting diode; a first transistor connected between the first power source and the organic light emitting diode, the first transistor controlling the driving current corresponding to a voltage of a first node; a second transistor connected between the jth data line and the first node, the second transistor being turned on when a scan signal is supplied to the ith scan line; and a storage capacitor connected between the first node and the first power source.

The readout circuit may include: a differential amplifier including a first input terminal for receiving the sensing voltage, a second input terminal for receiving the noise voltage, and an output terminal for outputting an output signal; an auxiliary capacitor connected between the first input terminal and the output terminal; a third switch connected between any one of the second sensing electrodes and the first input terminal; and a fourth switch disposed in parallel to the auxiliary capacitor, the fourth switch being connected between the first input terminal and the output terminal.

The first input terminal may receive the sensing voltage, and the second input terminal may receive the noise voltage.

Another exemplary embodiment of the invention provides a display device including: a display panel including an organic light emitting diode that emits light corresponding to a driving current flowing from a first power source to a second power source, and a noise detector configured to detect noise of the second power source; and an input sensing layer including first sensing electrodes and second sensing electrodes, which intersect each other, and a readout circuit configured to remove the noise included in a sensing voltage received from the second sensing electrodes. The noise detector generates a noise voltage representing the nose and outputs the noise voltage to the readout circuit.

The noise detector may include a sensing capacitor configured to store the noise voltage.

The readout circuit may include: a differential amplifier including a first input terminal for receiving the sensing voltage, a second input terminal for receiving the noise voltage, and an output terminal for outputting an output signal; and an auxiliary capacitor connected between the first input terminal and the output terminal.

The input sensing layer may be directly disposed on the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
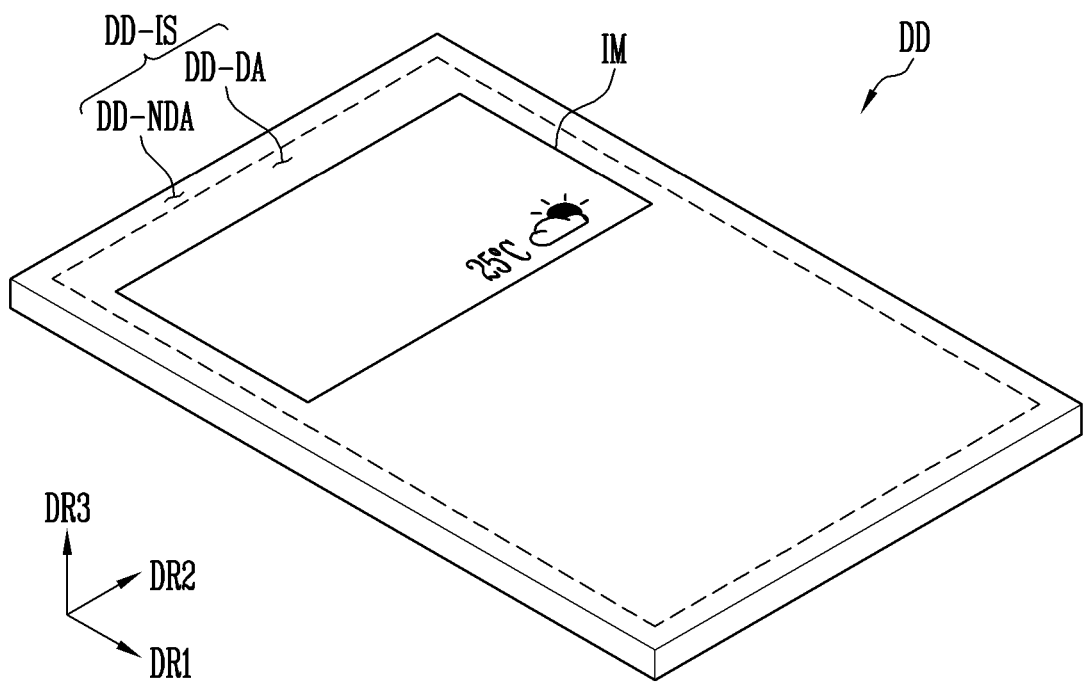
FIG. 1 is a view illustrating a display device according to an exemplary embodiment of the invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," is when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

FIG. 1 is a view illustrating a display device DD according to an exemplary embodiment of the invention.

As shown in FIG. 1, the display device DD may include a display surface DD-IS.

The display surface DD-IS may be located at a front surface of the display device DD. The display device DD may display an image IM through the display surface DD-IS. The display surface DD-IS is parallel to a surface defined by a first direction DR1 and a second direction DR2. A normal direction of the display surface DD-IS, i.e., a thickness direction of the is display device DD with respect to the display surface DD-IS, indicates a third direction DR3.

A front surface (or top surface) and a back surface (or bottom surface) of each member or unit described hereinbelow is distinguished by the third direction DR3. However, the first to third directions DR1, DR2, and DR3 illustrated in this exemplary embodiment are merely illustrative, and the directions indicated by the first to third directions DR1, DR2, and DR3 are relative concepts, and may be changed into other directions. Hereinafter, first to third directions are directions respectively indicated by the first to third directions DR1, DR2, and DR3, and are designated by like reference numerals.

In an exemplary embodiment of the invention, the display device DD including a planar display surface DD-IS is illustrated, but the inventive concepts are not limited thereto. The display device DD may include a curved display surface DD-IS or a stereoscopic display surface DD-IS.

The display device DD according to an exemplary embodiment of the invention may be a rigid display device. However, the inventive concepts are not limited thereto, and the display device DD according to another exemplary embodiment of the invention may be a flexible display device.

In this exemplary embodiment, the display device DD applicable to a mobile phone terminal is illustrated. Although not shown in the drawings, electronic modules, a camera module, a power module, and the like, which are mounted on a main board, are disposed together with the display device DD in a bracket/case, etc., thereby constituting a mobile phone terminal.

The display device DD according to the inventive concepts may be applied to not only large-sized electronic devices, such as televisions and monitors, but also medium-/small-sized electronic devices such as tablet PCs, vehicle navigation systems, game consoles, and smart watches.

Referring to FIG. 1, the display surface DD-IS includes a display area DD-DA in which the image IM is displayed and a non-display area DD-NDA adjacent to the display area DD-DA. The non-display area DD-NDA may be an area in which any image is not displayed. In FIG. 1, temperature and weather images are illustrated as an example of the image IM.

As shown in FIG. 1, the display area DD-DA may have a quadrangular shape. However, the inventive concepts not limited thereto, and the display area DD-DA and the non-display area DD-NDA may be designed in various shapes (e.g., a rhombus shape, a circular shape, an elliptical shape, and the like).

The non-display area DD-NDA may surround the display area DD-DA.

Figure 2:
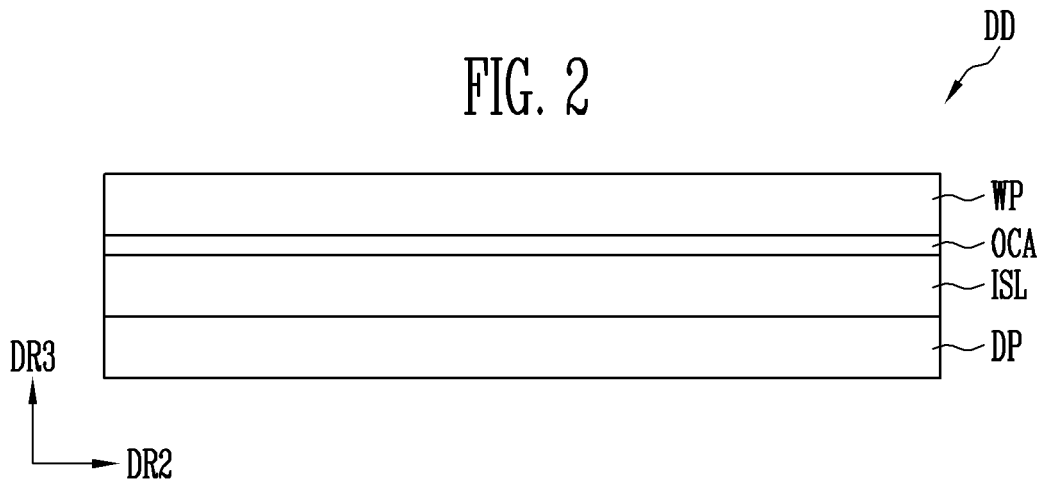
FIG. 2 is a section view of the display device according to an exemplary embodiment of the invention.

FIG. 2 is a view illustrating a section of a display device DD according to an exemplary embodiment of the invention.

FIG. 2 illustrates a section defined by a second direction DR2 and a third direction DR3. FIG. 2 is simply illustrated to describe a stacking relationship between a functional panel and/or functional units, which constitute the display device DD.

The display device DD according to this exemplary embodiment of the invention may include a display panel, an input sensing unit, and a window unit. At least some components among the display panel, the input sensing unit, and the window unit may be formed by a continuous process. Alternatively, at least some components among the display panel, the input sensing unit, and the window unit may be coupled to each other through an adhesive member. In FIG. 2, an optically transparent adhesive member OCA is illustrated as a representative example of the adhesive member. The adhesive member described hereinbelow may include a general adhesive or gluing agent.

Between the input sensing unit and the window unit, a corresponding component formed with another component through a continuous process is expressed as a "layer."

Between the input sensing unit and the window unit, a corresponding component coupled to another component through an adhesive member is expressed as a "panel."

The "panel" includes a base layer that provides a base surface, e.g., a synthetic resin film, a composite material film, a glass substrate, and the like, but the base layer may be omitted in the "layer." In other words, the units each expressed as the "layer" are disposed on a base surface provided by another unit.

The input sensing unit and the window unit may be designated as an input sensing panel and a window panel or an input sensing layer and a window layer according to the existence/nonexistence of a base layer.

In this specification, "that component A is directly disposed on component A" means that any separate adhesive layer/adhesive member is not disposed between the component A and the component B. The component B is formed on a base surface provided by the component A through a continuous process after the component A is formed.

As shown in FIG. 2, the display device DD may include a display panel DP, an input sensing layer ISL, and a window panel WP.

The display panel DP may generate an image.

The input sensing layer ISL may be directly disposed on the display panel DP.

The display panel DP and the input sensing layer ISL directly disposed on the display panel DP may be defined as a display module DM.

An operatically transparent adhesive member OCA may be disposed between the display module DM and the window panel WP.

In an exemplary embodiment of the invention, the display panel DP may be a light emitting display panel, but is not particularly limited. For example, the display panel DP may be an organic light emitting display panel or a quantum dot light emitting display panel. An emitting layer of the organic light emitting display panel may include an organic light emitting material. An emitting layer of the quantum dot light emitting display panel may include a quantum dot, a quantum rod, and the like. Hereinafter, the display panel DP is described as the organic light emitting display panel.

The input sensing layer ILS may sense a user input (e.g., a touch, a pressure, a fingerprint, etc.). That is, the input sensing layer ISL may acquire coordinate information or pressure information of the user input.

In FIG. 2, it is illustrated that the input sensing layer ISL entirely overlaps with the display panel DP.

Referring to FIGS. 1 and 2, the input sensing layer ISL may entirely overlap with the display area DD-DA. However, the inventive concepts are not limited thereto, and the input sensing layer ISL may partially overlap with the display area DD-DA, or overlap with only the non-display area DD-NDA.

The input sensing layer ISL may be a touch sensing panel for sensing a touch of a user or a fingerprint sensing panel for sensing fingerprint information of a finger of the user.

Figure 3:
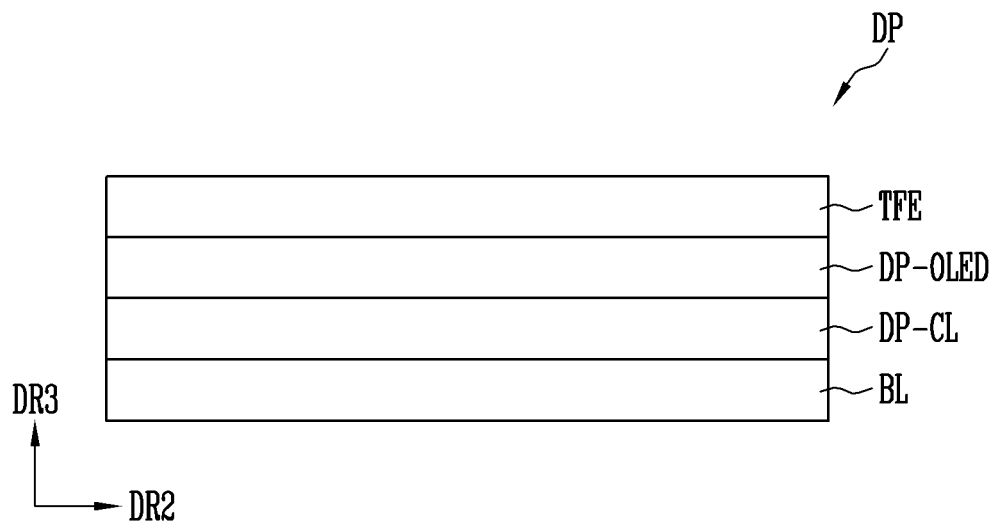
FIG. 3 is a section view of a display panel according to an exemplary embodiment of the invention.

FIG. 3 is a view illustrating a section of a display panel DP according to an exemplary embodiment of the invention.

Referring to FIG. 3, the display panel DP may include a base layer BL, and a circuit element layer DP-CL, a display element layer DP-OLED, and a thin film encapsulation layer TFE, which are disposed on the base layer BL. Although not separately shown in the drawing, the display panel DP may further include functional layers, such as a reflection preventing layer and a refractive index adjusting layer.

The base layer BL may include a synthetic resin film. A synthetic resin layer is formed on a working substrate used in manufacturing of the display panel DP. Subsequently, a conductive layer, an insulating layer, and the like are formed on the synthetic resin layer. If the working substrate is removed, the synthetic resin layer corresponds to the base layer BL. The synthetic resin layer may be a polyimide-based resin layer, although the material of the synthetic resin layer is not particularly limited. In addition, the base layer BL may include a glass substrate, a metal substrate, an organic/inorganic composite material substrate, etc.

The circuit element layer DP-CL may include at least one insulating layer and a circuit element. Hereinafter, the insulating layer included in the circuit element layer DP-CL is referred to as an intermediate insulating layer. The intermediate insulating layer may include at least one intermediate inorganic layer and at least one intermediate organic layer.

The circuit element may include a signal lines, a driving circuit of a pixel, and the like. The circuit element layer DP-CL may be formed through a process of an insulating layer, a semiconductor layer, and a conductive layer through coating, deposition, etc. and a process of patterning the insulating layer, the semiconductor layer, and the conductive layer through a photolithography process.

The display element layer DP-OLED may include light emitting devices. The display element layer DP-OLED may include organic light emitting diodes. The display element layer DP-OLED may further include an organic layer such as a pixel defining layer.

The thin film encapsulation layer TFE may encapsulate the display element layer DP-OLED. The thin film encapsulation layer TFE may include at least one insulating layer. In is an exemplary embodiment of the invention, the thin film encapsulation layer TFE may include at least one inorganic layer (hereinafter, referred to as an encapsulation inorganic layer). In an exemplary embodiment of the invention, the thin film encapsulation layer TFE may include at least one organic layer (hereinafter, referred to as an encapsulation organic layer) and at least one encapsulation inorganic layer.

The encapsulation inorganic layer protects the display element layer DP-OLED from moisture/oxygen infiltration, and the encapsulation organic layer protects the display element layer DP-OLED from infiltration by foreign matters, such as dust particles. The encapsulation inorganic layer may include a silicon nitride layer, a silicon oxynitride layer, a silicon oxide layer, a titanium oxide layer, an aluminum oxide layer, etc., but is not particularly limited. The encapsulation organic layer may include an acryl-based organic layer, but is not particularly limited.

Figure 4:
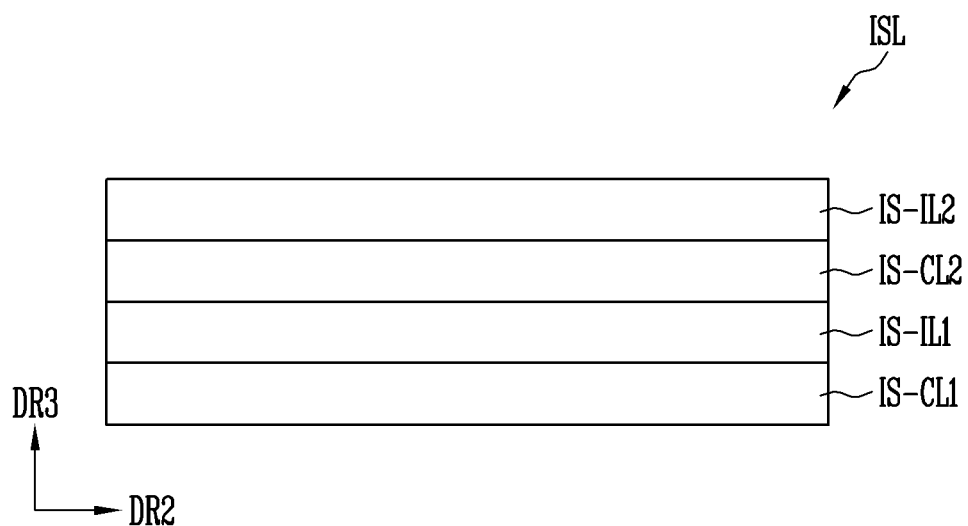
FIG. 4 is a section view of an input sensing layer according to an exemplary embodiment of the invention.

FIG. 4 is a view illustrating a section of an input sensing layer ISL according to an exemplary embodiment of the invention.

The input sensing layer in the "layer" form is directly disposed on the base surface provided by the display panel DP. Therefore, unlike the input sensing panel in the "panel" form, the input sensing layer ISL may not include the base layer. Thus, the thickness of the display module can be decreased. The base surface of the input sensing layer ISL shown in FIG. 4 may be a top surface of the thin film encapsulation layer TFE of the display panel DP shown in FIG. 3.

Since the thin film encapsulation layer TFE is not sufficiently thick enough to block noise, noise generated by components of the display element layer DP-OLED may have an influence on components of the display element layer DP-OLED or the input sensing layer ISL.

Figure 6:
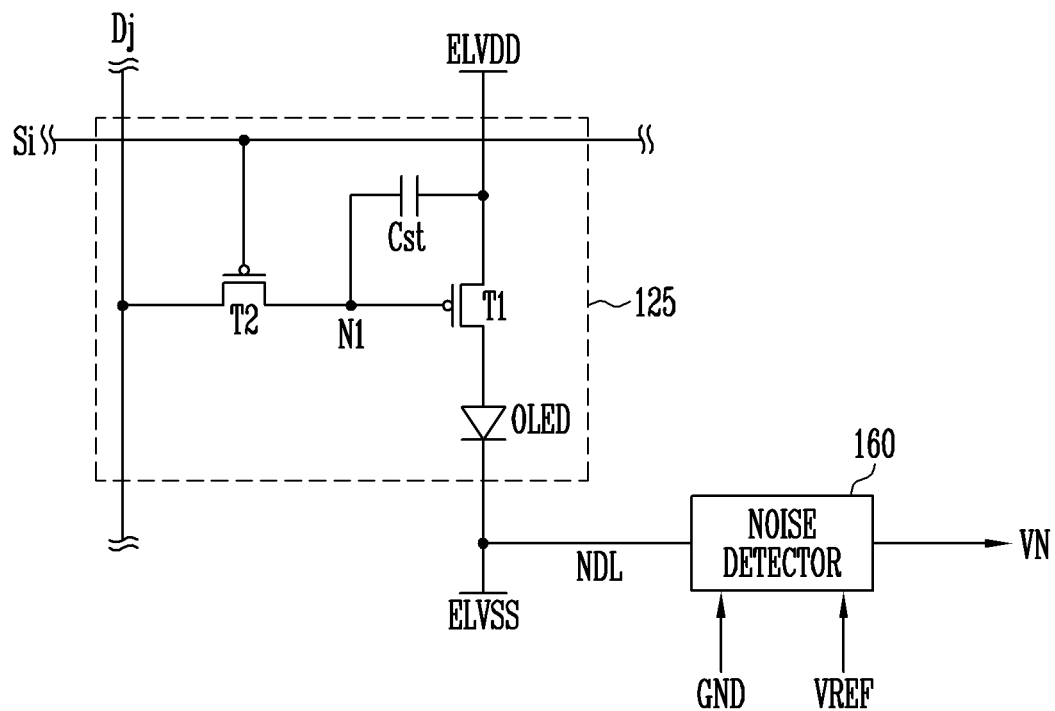
FIG. 6 is a view illustrating a pixel according to an exemplary embodiment of the invention.

Specifically, a cathode electrode of an organic light emitting diode OLED (see FIG. 6) is located on the top of the display element layer DP-OLED, and is connected to a second power source ELVSS (see FIG. 6). Hence, noise may have an influence on the second power source ELVSS and the input sensing layer ISL.

The input sensing layer ISL in either of the "layer" form or the "panel" form may have a multi-layered structure.

The input sensing layer ISL may include sensing electrodes, signal lines connected to the sensing electrodes, and at least one insulating layer.

The input sensing layer ISL may sense an external input, using, for example, a capacitance method. However, the present disclosure is not limited thereto. In some embodiments, the input sensing layer ISL may sense an external input, using an electromagnetic induction method or a pressure sensing method.

As shown in FIG. 4, the input sensing layer ISL according to the embodiment of the present disclosure may include a first conductive layer IS-CL1, a first insulating layer IS-IL1, a second conductive layer IS-CL2, and a second insulating layer IS-IL2. For example, the first conductive layer IS-CL1, the first insulating layer IS-IL1, the second conductive layer IS-CL2, and the second insulating layer IS-IL2 may be sequentially stacked.

Each of the first conductive layer IS-CL1 and the second conductive layer IS-CL2 may have a single-layered structure or a multi-layered structure in which layers are stacked along a third direction DR3. Each of the first conductive layer IS-CL1 and the second conductive layer IS-CL2 may include at least one of a metal layer and a transparent conductive layer.

In some exemplary embodiments, each of the first conductive layer IS-CL1 and the second conductive layer IS-CL2 may include sensing electrodes. However, the inventive is concepts are not limited thereto, and any one of the first conductive layer IS-CL1 and the second conductive layer IS-CL2 may include sensing electrodes.

The stack structure and material of the sensing electrodes may be determined by considering sensing sensitivity. An RC delay may have influence on the sensing sensitivity. Since the sensing electrodes including the metal layer have a resistance lower than that of the transparent conductive layer, the RC value of the sensing electrodes is decreased. Therefore, the charging time of a capacitor defined between the sensing electrodes is decreased. The sensing electrodes including the transparent conductive layer are not viewed by a user, as compared with the metal layer, and the input area of the sensing electrodes is increased, thereby increasing capacitance.

The sensing electrodes including the metal layer may have a mesh shape so as to prevent the sensing electrodes from being viewed by the user.

Each of the first insulating layer IS-IL1 and the second insulating layer IS-IL2 may have a single- or multi-layered structure. Each of the first insulating layer IS-IL1 and the second insulating layer IS-IL2 may include an inorganic material, an organic material, or a composite material.

Figure 5:
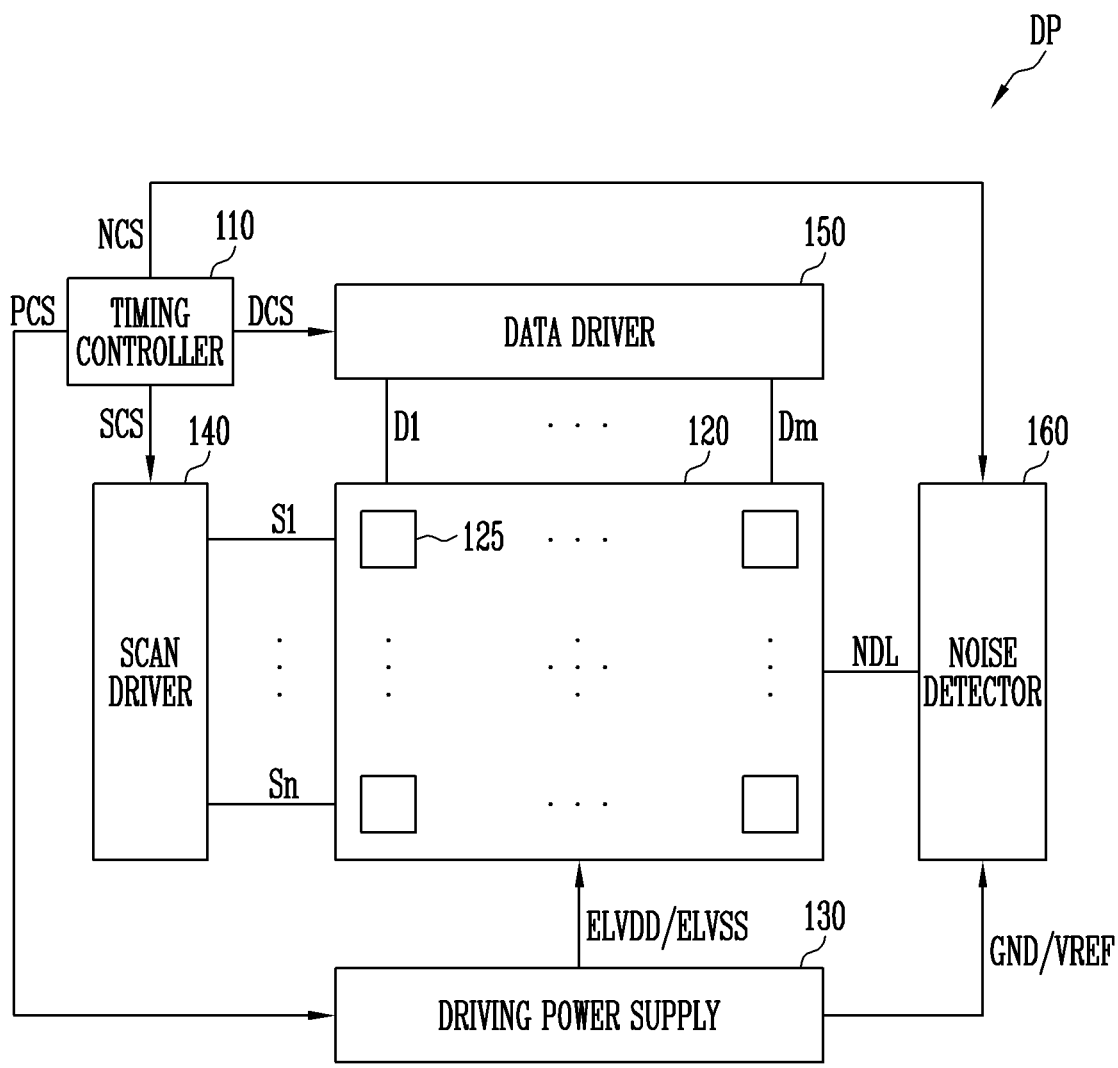
FIG. 5 is a view illustrating a display panel according to an exemplary embodiment of the invention.

FIG. 5 is a view illustrating a display panel DP according to an exemplary embodiment of the invention.

Referring to FIG. 5, the display panel DP may include a timing controller 110, a pixel unit 120, a driving power supply 130, a scan driver 140, a data driver 150, and a noise detector 160.

The timing controller 110 may control the other components (e.g., the driving power supply, the scan driver, data driver, and the noise detector) included in the display panel DP, based on image data and timing signals (e.g., a vertical synchronization signal, a horizontal synchronization signal, a data enable signal, a clock signal, and the like), which are output from a host system (not shown).

For example, the timing controller 110 may output a power supply control signal PCS to the driving power supply 130, output a scan driving control signal SCS to the scan driver 140, output a data driving control signal DCS to the data driver 150, and output a noise detection control signal NCS to the noise detector 160.

The pixel unit 120 may include pixels 125. For example, the pixel unit 120 may correspond to the display area DD-DA shown in FIG. 1.

The pixels 125 may be arranged in a matrix structure. For example, the pixels 125 may be connected to scan lines S1 to Sn (n is a natural number) formed for every horizontal line and data lines D1 to Dm (m is a natural number) formed for every vertical line.

Each of the pixels 125 may supply light with a predetermined luminance to the outside, corresponding to a data signal.

The driving power supply 130 may operate in response to the power supply control signal PCS received from the timing controller 110.

The driving power supply 130 may supply a first power source ELVDD and a second power source ELVSS to the pixel unit 120, and supply a third power source VREF and a fourth power source GND to the noise detector 160.

The first power source ELVDD may have a voltage higher than that of the second power source ELVSS.

The third power source VREF may have a preset voltage. For example, the third power source VREF may have the voltage of the second power source ELVSS, in which any is noise is not included.

The fourth power source GND may have a ground voltage. For example, the fourth power source GND may have a voltage of 0 V.

The scan driver 140 may operate in response to the scan driving control signal SCS received from the timing controller 110.

The scan driver 140 may supply scan signals to the scan lines S1 to Sn.

If the scan signals are supplied to the scan lines S1 to Sn, a transistor included in each of the pixels 125 may be turned on. To this end, the scan signals may be set to a gate-on voltage (e.g., a low voltage) such that the transistor included in each of the pixels 125 can be turned on.

The data driver 150 may operate in response to the data driving control signal DCS received from the timing controller 110.

The data driver 150 may supply data signals to the data lines D1 to Dm.

For example, the data driver 150 may supply, to the data lines D1 to Dm, data signals having a voltage corresponding to the image data.

The data driver 150 may supply data signals to be synchronized with scan signals sequentially supplied to the scan lines S1 to Sn.

At this time, the voltage corresponding to the image data may be stored in the pixels 125.

The noise detector 160 may operate in response to the noise detection control signal NCS received from the timing controller 110.

The noise detector 160 may be supplied with the third power source VREF and the fourth power source GND.

Referring to FIGS. 3 and 4, since the thin film encapsulation layer TFE is not sufficiently thick enough to block noise, noise generated by components of the display element layer DP-OLED may have an influence on the display element layer DP-OLED and the input sensing layer ISL.

The noise detector 160 may detect noise from the second power source ELVSS. That is, the noise detector 160 may generate a noise voltage representing the noise.

FIG. 6 is a view illustrating a pixel 125 according to an exemplary embodiment of the invention. For convenience of description, FIG. 6 illustrates an equivalent circuit diagram of the pixel according to the exemplary embodiment of the invention and the noise detector 160.

A pixel disposed on an ith (i is a natural number) row and a jth (j is a natural number) column of the pixel unit is illustrated in FIG. 6. For convenience, a current scan line on the ith row is referred to as an "ith scan line Si," and a data line on the jth column is referred to as a "data line Dj."

In FIG. 6, the ith scan line Si may be a current scan line for supplying a scan signal to pixels on the ith row.

Referring to FIG. 6, the pixel 125 according to this exemplary embodiment of the invention may include a display element (e.g., an organic light emitting diode OLED), a first transistor T1, a second transistor T2, and a storage capacitor Cst.

An anode electrode of the organic light emitting diode OLED may be connected to the first transistor T1, and a cathode electrode of the organic light emitting diode OLED may be connected to a second power source ELVSS. The organic light emitting diode OLED generates light with a predetermined luminance corresponding to an amount of driving current supplied from the first transistor T1. The voltage of a first power source ELVDD may be set is higher than that of the second power source ELVSS such that the driving current can flow through the organic light emitting diode OLED. For example, the organic light emitting diode OLED may emit an amount of light corresponding to the driving current flowing from the first power source ELVDD to the second power source ELVSS.

A first electrode of the first transistor (driving transistor) T1 may be connected to the first power source ELVDD, and a second electrode of the first transistor T1 may be connected to the anode electrode of the organic light emitting diode OLED. In addition, a gate electrode of the first transistor T1 may be connected to a first node N1. The first transistor T1 may control an amount of driving current flowing from the first power source ELVDD to the second power source ELVSS via the organic light emitting diode OLED.

The second transistor (scan transistor) T2 may be connected between the data line Dj and the first node N1. In addition, a gate electrode of the second transistor T2 may be connected to the ith scan line Si. The second transistor T2 may be turned on when a scan signal is supplied to the ith scan line Si, to allow the data line Dj and the first electrode of the first transistor T1 to be electrically connected to each other. That is, the second transistor T2 may transfer a data signal applied to the data line Dj to the first transistor T1, based on the scan signal applied to the first scan line Si.

The storage capacitor Cst may be connected between the first power source ELVDD and the first node N1. The storage capacitor Cst may store a voltage corresponding to the data signal and a threshold voltage of the first transistor T1.

The equivalent circuit of the pixel 125 is merely an example, and the inventive concepts are not limited thereto. The pixel 125 may further include a plurality of transistors, and include a greater number of capacitors.

The noise detector 160 may be connected to the second power source ELVSS. For example, the noise detector 160 may be connected to the second power source ELVSS through a noise detection line NDL.

The noise detection line NDL may connect the cathode electrode of the organic light emitting diode OLED, i.e., the second power source ELVSS to the noise detector 160.

The noise detector 160 may be supplied with a third power source VREF and a fourth power source GND.

The noise detector 160 may detect noise from the second power source ELVSS, and generate a noise voltage VN representing the noise.

Figure 7:
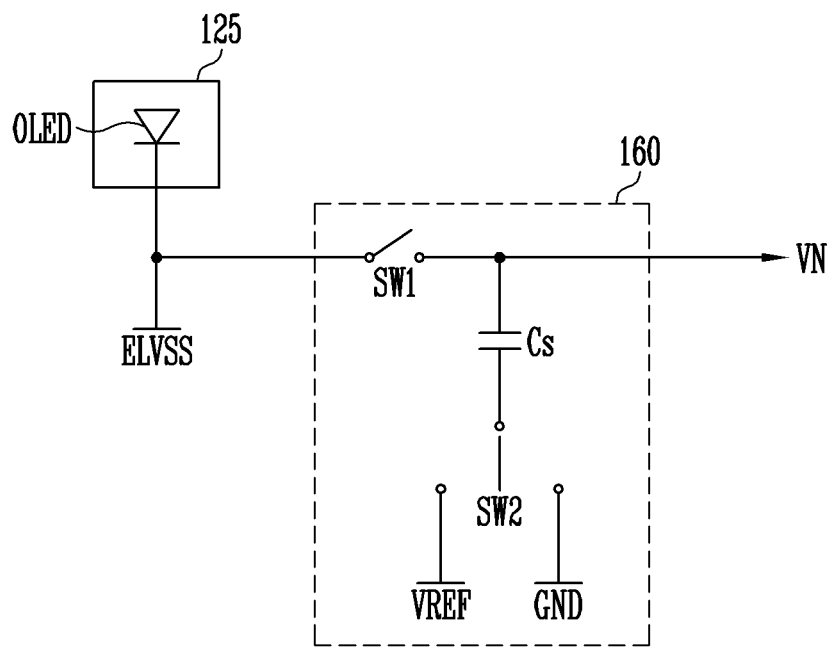
FIG. 7 is a view illustrating a noise detector according to an exemplary embodiment of the invention.

FIG. 7 is a view illustrating a noise detector 160 according to an exemplary embodiment of the invention. For convenience of description, a pixel 125 including an organic light emitting diode OLED and the noise detector 160 are illustrated in FIG. 7.

Referring to FIG. 7, the noise detector 160 may be connected to a second power source ELVSS. The noise detector 160 may detect noise generated in the second power source ELVSS, and generate a noise voltage VN representing the noise.

The noise detector 160 may include a sensing capacitor Cs, a first switch SW1, and a second switch SW2.

The first switch SW1 may be connected between a first electrode of the sensing capacitor Cs and the second power source ELVSS.

The second switch SW2 may selectively supply any one of a third power source VREF and a fourth power source GND to a second electrode of the sensing capacitor Cs.

For example, control signals of the first switch SW1 and the second switch SW2 may be included in the noise detection control signal NCS shown in FIG. 6.

A specific operation of the noise detector 160 is as follows.

First, the first switch SW1 is turned on. If the first switch SW1 is turned on, the second switch SW2 may be toggled to supply the third power source VREF to the second electrode of the sensing capacitor Cs.

At this time, the second power source ELVSS, including the noise, may be supplied to the first electrode of the sensing capacitor Cs, and the third power source VREF may be supplied to the second electrode of the sensing capacitor Cs. Therefore, the sensing capacitor Cs may store a difference between voltages of the power sources supplied to the two electrodes thereof. For example, if the voltage of the second power source ELVSS is designated as [ELVSS], the voltage of the noise is designated as [VN], and the voltage of the third power source VREF is designated as [VREF], the sensing capacitor Cs may store a voltage of [ELVSS+VN−VREF]. At this time, if the voltage of the third power source VREF is adjusted to be equal to that of the second power source ELVSS, the sensing capacitor Cs may store the voltage of [VN], i.e., the noise voltage VN.

Next, the first switch SW1 is turned off. If the first switch SW is turned off, the second switch SW2 may supply the fourth power source GND to the second electrode of the sensing capacitor Cs.

At this time, the fourth power source GND may have a voltage of 0 V. Therefore, the voltage of the first electrode of the sensing capacitor Cs may be equal to the noise voltage VN.

Figure 8:
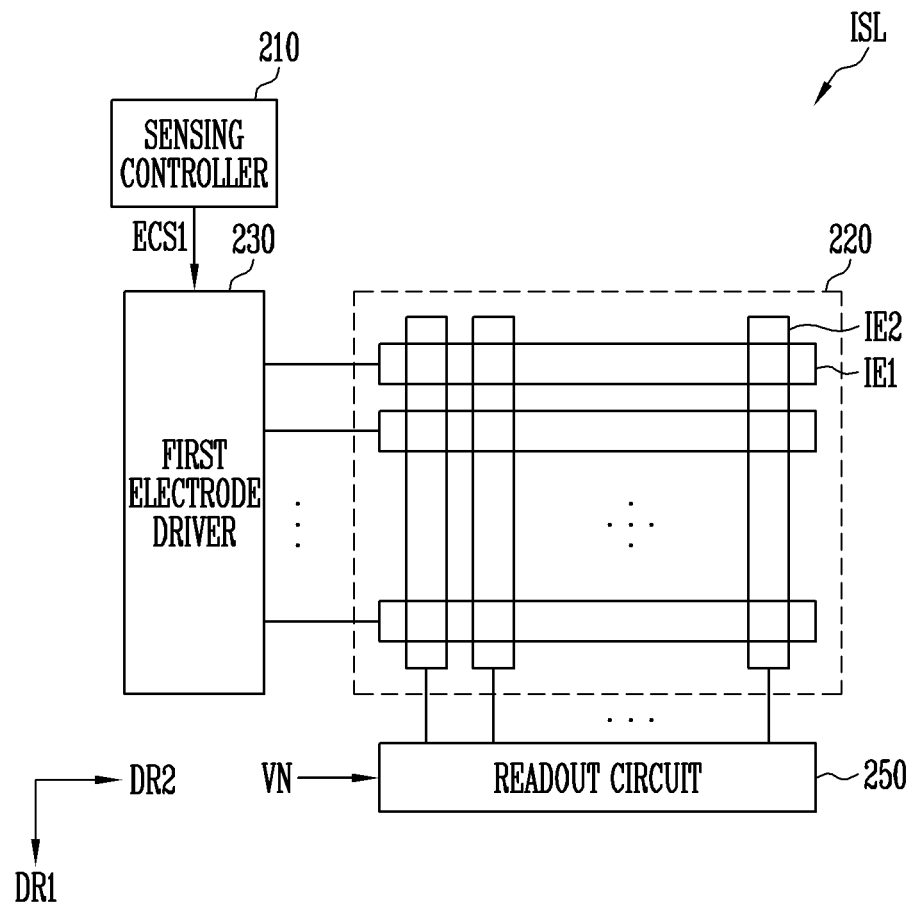
FIG. 8 is a view illustrating an input sensing layer according to an exemplary embodiment of the invention.

FIG. 8 is a view illustrating an input sensing layer ISL according to an exemplary embodiment of the invention.

Referring to FIG. 8, the input sensing layer ISL may include a sensing controller 210, an electrode unit 220, a first electrode driver 230, and a readout circuit 250.

The sensing controller 210 may control the other components included in the input sensing layer ISL under the control of a host system (not shown).

For example, the sensing controller 210 may output a first electrode driving control signal ECS1 to the first electrode driver 230.

The electrode unit 220 may include sensing electrodes. For example, the electrode unit 220 may correspond to the display area shown in FIG. 1.

At least some of the sensing electrodes may be directly disposed on the thin film encapsulation layer TFE of the display panel DP shown in FIG. 2.

The sensing electrodes may include first sensing electrodes IE1 and second sensing electrodes 1E2.

The first sensing electrodes IE1 may be arranged along a first direction DR1, and each of the first sensing electrodes IE1 may extend in a second direction DR2.

The first sensing electrodes IE1 may sense an external input using a mutual cap method and/or a self-cap method. After a coordinate of the external input is calculated using the mutual cap method during a first section, a coordinate of the external input may be re-calculated using the self-cap method during a second section.

In an exemplary embodiment, although the first sensing electrodes IE1 are illustrated in FIG. 8, the shape of the first sensing electrodes IE1 is not particularly limited, and the first sensing electrodes IE1 may have various other shapes, such as a rhombus shape.

The first sensing electrodes IE1 may be connected to the first electrode driver 230 through signal lines.

In some exemplary embodiments, the first sensing electrodes IE1 may have a is mesh shape and include a metal. The first sensing electrodes IE1 may be designated as metal mesh patterns.

The second sensing electrodes 1E2 may be arranged along the second direction DR2, and each of the second sensing electrodes 1E2 may extend in the first direction DR1.

The second sensing electrodes 1E2 may sense an external input, using a mutual cap method and/or a self-cap method. After a coordinate of the external input is calculated using the mutual cap method during a first section, a coordinate of the external input may be re-calculated using the self-cap method during a second section.

In an exemplary embodiment, although the second sensing electrodes 1E2 are illustrated in FIG. 8, the shape of the second sensing electrodes IE2 is not particularly limited, and the second sensing electrodes IE2 may have various other shapes, such as a rhombus shape.

The second sensing electrodes IE2 may be connected to the readout circuit 250 through signal lines.

In some embodiments, the second sensing electrodes IE2 may have a mesh shape and include a metal. The second sensing electrodes IE2 may be designated as metal mesh patterns.

The first sensing electrode IE1 and the second sensing electrodes IE2 may intersect each other.

The first electrode driver 230 may operate in response to the first electrode driving control signal ECS1 received from the sensing controller 210.

The first electrode driver 230 may supply first electrode driving signals to the first sensing electrodes IE1.

If the first electrode driving signals are supplied, the first sensing electrodes IE1 is may have a specific voltage.

In some exemplary embodiments, the first electrode driver 230 may sequentially or simultaneously supply the first electrode driving signals.

Voltages of the first sensing electrodes IE1 and the second sensing electrodes IE2 may be changed by a touch of a user. Hereinafter, the voltage of the second sensing electrodes IE2 is referred to as a sensing voltage.

If the user touches the front surface of the display device DD (see FIG. 1), which overlaps with the electrode unit 220, with a finger thereof, the finger of the user may be in contact with the top of the first sensing electrodes IE1 and the second sensing electrodes IE2. If the finger of the user is in contact with the top of the first sensing electrodes 1E1 and the second sensing electrodes IE2, a portion of the electric field formed between the first sensing electrodes IE1 and the second sensing electrodes IE2 may be reduced. If the electric field is reduced, the capacitance formed between the first sensing electrodes IE1 and the second sensing electrodes IE2 may be changed. As the capacitance formed between the first sensing electrodes IE1 and the second sensing electrodes IE2 is changed, the sensing voltage may be changed.

In addition, the sensing voltage may be changed by noise generated by components of the display element layer DP-OLED (see FIG. 3).

For example, since the thin film encapsulation layer TFE is not sufficiently thick enough to block noise, the noise generated by the components of the display element layer DP-OLED may have an influence on the display element layer DP-OLED and the second sensing electrodes IE2 of the input sensing layer ISL. The sensing voltage may be changed due to the influence.

The readout circuit 250 may receive the sensing voltage. Also, the readout circuit 250 may receive the noise voltage VN described in FIG. 7.

The readout circuit 250 may remove noise included in the sensing voltage, based on the noise voltage VN, thereby generating an output signal.

Figure 9:
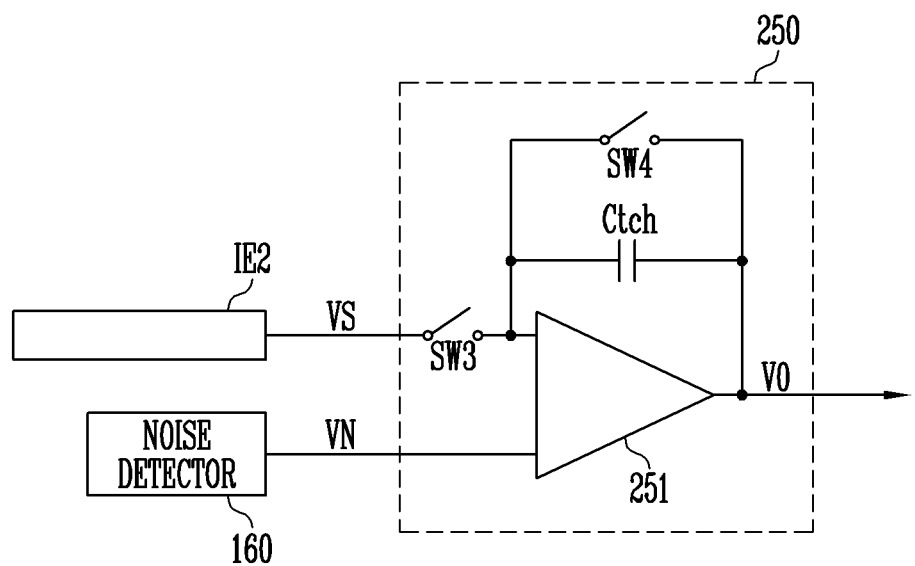
FIG. 9 is a view illustrating a readout circuit according to an exemplary embodiment of the invention.

FIG. 9 is a view illustrating a readout circuit 250 according to an exemplary embodiment of the invention. For convenience of description, FIG. 9 illustrates a second sensing electrode IE2, the noise detector 160, and the readout circuit 250.

Referring to FIG. 9, the readout circuit 250 may remove noise included in a sensing voltage VS based on a noise voltage VN, thereby generating an output signal VO.

The readout circuit 250 may include a differential amplifier 251, an auxiliary capacitor Ctch, a third switch SW3, and a fourth switch SW4.

The differential amplifier 251 may include a first input terminal for receiving the sensing voltage VS, a second input terminal for receiving the noise voltage VN, and an output terminal for outputting the output signal VO.

For example, the first input terminal may be a negative electrode terminal, and the second input terminal may be a positive electrode terminal.

The auxiliary capacitor Ctch may be connected between the first input terminal and the output terminal.

The third switch SW3 may be connected between any one of the second sensing electrodes 1E2 and the first input terminal.

From a circuit point of view, the differential amplifier 251, the auxiliary capacitor Ctch, and the third switch SW3 may constitute an integrating circuit.

The fourth switch SW4 may be disposed in parallel to the auxiliary capacitor Ctch, and be connected between the first input terminal and the output terminal.

For example, control signals of the third switch SW3 and the fourth switch SW4 may be generated from the sensing controller 210 shown in FIG. 8.

In some exemplary embodiments, the fourth switch SW4 may be omitted.

A specific operation of the readout circuit 250 is as follows.

First, the third switch SW3 is turned on. If the third switch SW3 is turned on, the auxiliary capacitor Ctch may be initialized.

After this, if the third switch SW3 is turned off and the fourth switch SW4 is turned on, the sensing voltage VS including the noise may be input to the first input terminal, and the noise voltage VN may be input to the second input terminal. For example, if the sensing voltage is designated as [VS] and the voltage of the noise is designated as [VN], a voltage of [VS+VN] may be applied to the first input terminal, and the voltage of [VN] may be applied to the second input terminal.

Therefore, the differential amplifier 251 may generate the output signal VO, based on the difference voltage [VS] between the first input terminal and the second input terminal.

According to the exemplary embodiments of the invention, the display panel included in the display device can detect noise from a driving power source.

Further, according to the exemplary embodiments of the invention, the input sensing layer included in the display device can remove noise of a sensing signal.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
a display panel configured to generate an image; and
an input sensing layer disposed on the display panel, the input sensing layer sensing a user input,
wherein:
the display panel comprises:

pixels each comprising an organic light emitting diode configured to emit light corresponding to a driving current flowing from a first power source to a second power source; and
a noise detector configured to generate a noise voltage by detecting noise from the second power source;
the input sensing layer comprises:
first sensing electrodes and second sensing electrodes intersecting each other; and
a readout circuit configured to remove the noise included in a sensing voltage received from the second sensing electrodes, based on the noise voltage.

2. The display device of claim 1, wherein the input sensing layer is directly disposed on the display panel.

3. The display device of claim 1, wherein the display panel further comprises a driving power supply configured to supply the first power source and the second power source to the pixels and supply a third power source and a fourth power source to the noise detector.

4. The display device of claim 1, wherein the noise detector comprises a sensing capacitor configured to store the noise voltage.

5. The display device of claim 4, wherein the noise detector further comprises:
a first switch connected between a first electrode of the sensing capacitor and the second power source; and
a second switch configured to selectively supply any one of a third power source and a fourth power source to a second electrode of the sensing capacitor.

6. The display device of claim 5, wherein:
if the first switch is turned on, the second switch supplies the third power source to the second electrode of the sensing capacitor; and
if the first switch is turned off, the second switch supplies the fourth power source to the second electrode of the sensing capacitor.

7. The display device of claim 6, wherein:
the third power source has a voltage of the second power source, in which the noise is not included; and
the fourth power source has a ground voltage.

8. The display device of claim 1, further comprising:
a scan driver configured to supply scan signals to scan lines formed for every horizontal line; and
a data driver configured to supply data signals to data lines formed for every vertical line,
wherein the pixels are connected to the scan lines and the data lines.

9. The display device of claim 1, wherein a pixel connected to an ith (i is a natural number) scan line and a jth (j is a natural number) data line among the pixels comprises:
the organic light emitting diode;
a first transistor connected between the first power source and the organic light emitting diode, the first transistor controlling the driving current, corresponding to a voltage of a first node;
a second transistor connected between the jth data line and the first node, the second transistor being turned on when a scan signal is supplied to the ith scan line; and
a storage capacitor connected between the first node and the first power source.

10. The display device of claim 1, wherein the readout circuit comprises:
a differential amplifier comprising a first input terminal for receiving the sensing voltage, a second input terminal for receiving the noise voltage, and an output terminal for outputting an output signal;
an auxiliary capacitor connected between the first input terminal and the output terminal;
a third switch connected between any one of the second sensing electrodes and the first input terminal; and
a fourth switch disposed in parallel to the auxiliary capacitor, the fourth switch being connected between the first input terminal and the output terminal.

11. The display device of claim 10, wherein the first input terminal receives the sensing voltage, and the second input terminal receives the noise voltage.

12. A display device comprising:
a display panel comprising an organic light emitting diode configured to emit light corresponding to a driving current flowing from a first power source to a second power source, and a noise detector configured to detect noise of the second power source; and
an input sensing layer comprising first sensing electrodes and second sensing electrodes which intersect each other, and a readout circuit configured to remove the noise included in a sensing voltage received from the second sensing electrodes,
wherein the noise detector is configured to generate a noise voltage representing the noise and output the noise voltage to the readout circuit.

13. The display device of claim 12, wherein the noise detector comprises a sensing capacitor configured to store the noise voltage.

14. The display device of claim 13, wherein the readout circuit comprises:
a differential amplifier comprising a first input terminal for receiving the sensing voltage, a second input terminal for receiving the noise voltage, and an output terminal for outputting an output signal; and
an auxiliary capacitor connected between the first input terminal and the output terminal.

15. The display device of claim 12, wherein the input sensing layer is directly disposed on the display panel.

* * * * *